Jan. 7, 1964 W. L. FRESEMAN ETAL 3,117,283
ISO-ECHO CONTOUR DEVICE WITH CIRCUITRY TO EFFECT
THRESHOLD CLIPPING AND PULSE SHAPING
Filed Aug. 12, 1960
7 Sheets-Sheet 1

Inventors
WILLIAM L. FRESEMAN
FRANK H. STEPHENS, JR.

By R. I. Tomphins
Attorney

Inventors
WILLIAM L. FRESEMAN
FRANK H. STEPHENS, JR.

By R. I. Tompkins
Attorney

Jan. 7, 1964 W. L. FRESEMAN ETAL 3,117,283

ISO-ECHO CONTOUR DEVICE WITH CIRCUITRY TO EFFECT THRESHOLD CLIPPING AND PULSE SHAPING

Filed Aug. 12, 1960 7 Sheets-Sheet 3

INVENTORS
WILLIAM L. FRESEMAN
FRANK H. STEPHENS, JR.

BY R. I. Tompkins

ATTORNEY

INVENTORS
WILLIAM L. FRESEMAN
FRANK H. STEPHENS, JR.

BY R. I. Tomphin
ATTORNEY

Jan. 7, 1964 W. L. FRESEMAN ETAL 3,117,283

ISO-ECHO CONTOUR DEVICE WITH CIRCUITRY TO EFFECT THRESHOLD CLIPPING AND PULSE SHAPING

Filed Aug. 12, 1960 7 Sheets-Sheet 5

INVENTORS
WILLIAM L. FRESEMAN
FRANK H. STEPHENS, JR.

BY R. S. Tompkins

ATTORNEY

INVENTORS
WILLIAM L. FRESEMAN
FRANK H. STEPHENS, JR.

BY R. J. Tompkins
ATTORNEY

ISO-ECHO CONTOUR DEVICE WITH CIRCUITRY TO EFFECT THRESHOLD CLIPPING AND PULSE SHAPING
Filed Aug. 12, 1960 7 Sheets-Sheet 7

INVENTORS
WILLIAM L. FRESEMAN
FRANK H. STEPHENS, JR.
BY R. I. Tompkins
ATTORNEY

United States Patent Office 3,117,283

Patented Jan. 7, 1964

3,117,283

ISO-ECHO CONTOUR DEVICE WITH CIRCUITRY TO EFFECT THRESHOLD CLIPPING AND PULSE SHAPING

William L. Freseman, New York, N.Y., and Frank H. Stephens, Jr., Miami, Fla., assignors, by mesne assignments, to the United States of America as represented by the Secretary of the Navy Filed Aug. 12, 1960, Ser. No. 49,398
5 Claims. (Cl. 328—54)

The present invention relates to an iso-echo contour device and more particularly to an iso-echo contour device which is used to study the structure of meteorological phenomena by effecting a video inversion or cancellation of signal of all parts of the target which return a signal strength above a predetermined level.

One of the uses to which the present invention may be put is that, conceivably, the device might afford at least approximate quantitative measurements of rainfall. Ordinary radar weather systems are capable of distinguishing clearly only between rain and no rain, and a P.P.I. presentation derived from such systems shows only white areas for rain and black areas for no rain. Prior art iso-echo contour circuits have been provided with clipping means to clip the highest peaks of the return video signal and means to generate a blanking pulse from the clipped peak signals to turn off the beam in the cathode ray P.P.I. display tube for the duration of the peak signals. Thus a white area on the cathode ray tube indicating an area of some rainfall would have a black patch, or "hole," indicating an area of high rainfall. However, such a black center would be indistinguishable from a black patch indicating no rain at all, resulting in inaccurate presentation.

The present invention, however, offers considerable improvement over the inefficient prior art systems through the expedient of effective video inversion or cancellation of all signals above a predetermined level. Actually the inversion level on any target can be varied manually or by automatic switching at the end of each P.P.I. revolution in azimuth, and at present five automatic steps or levels are disclosed with a 3 decibel reduction between each step. Also, a meter calibrated in volts and decibels can be used to set manually any inversion level desired. Therefore, it is obvious that the severity of a particular meteorological target, or parts of a target, can be judged by the level at which sections invert on the cathode ray scope, with due regard to the range factor.

The present invention has many applications in addition to its utilization in the study of meteorological phenomena. Examples of such application could be the identification of local surface targets, aerial reconnaissance target identification, and aerial survey work, the target presentation in each case being improved by the inversion of echoes above a discrete level. The iso-echo contour device has been operated effectively on aircraft, the degree of effectiveness being proportional to the size of the plane and the range employed.

It is an object of the present invention to provide means, in a radar system, to distinguish between strong, medium, and weak signals.

Another object is to provide an iso-echo contour device for use in studying meteorological phenomena.

Still another object is to provide an iso-echo circuit for effecting a video inversion of signals above a predetermined level.

A further object is to provide an iso-echo contour circuit which inverts a video signal by a plurality of equal steps.

A still further object is to provide a novel clipper-selector circuit for obtaining video cancellation in steps as desired.

Another object is the provision of a novel iso-echo contour circuit whereby video inversion is obtained either manually or automatically as desired.

Other objects and many of the attendant advantages of this invention will be readily appreciated as the same becomes better understood by reference to the following detailed description when considered in connection with the accompanying drawings wherein:

FIGS. 1*a*, 1*b*, 1*c*, 1*d*, and 1*e* show a series of cathode ray tube displays illustrating the steps from no inversion to full inversion of a video signal, as practiced by the invention.

Figure 4A:
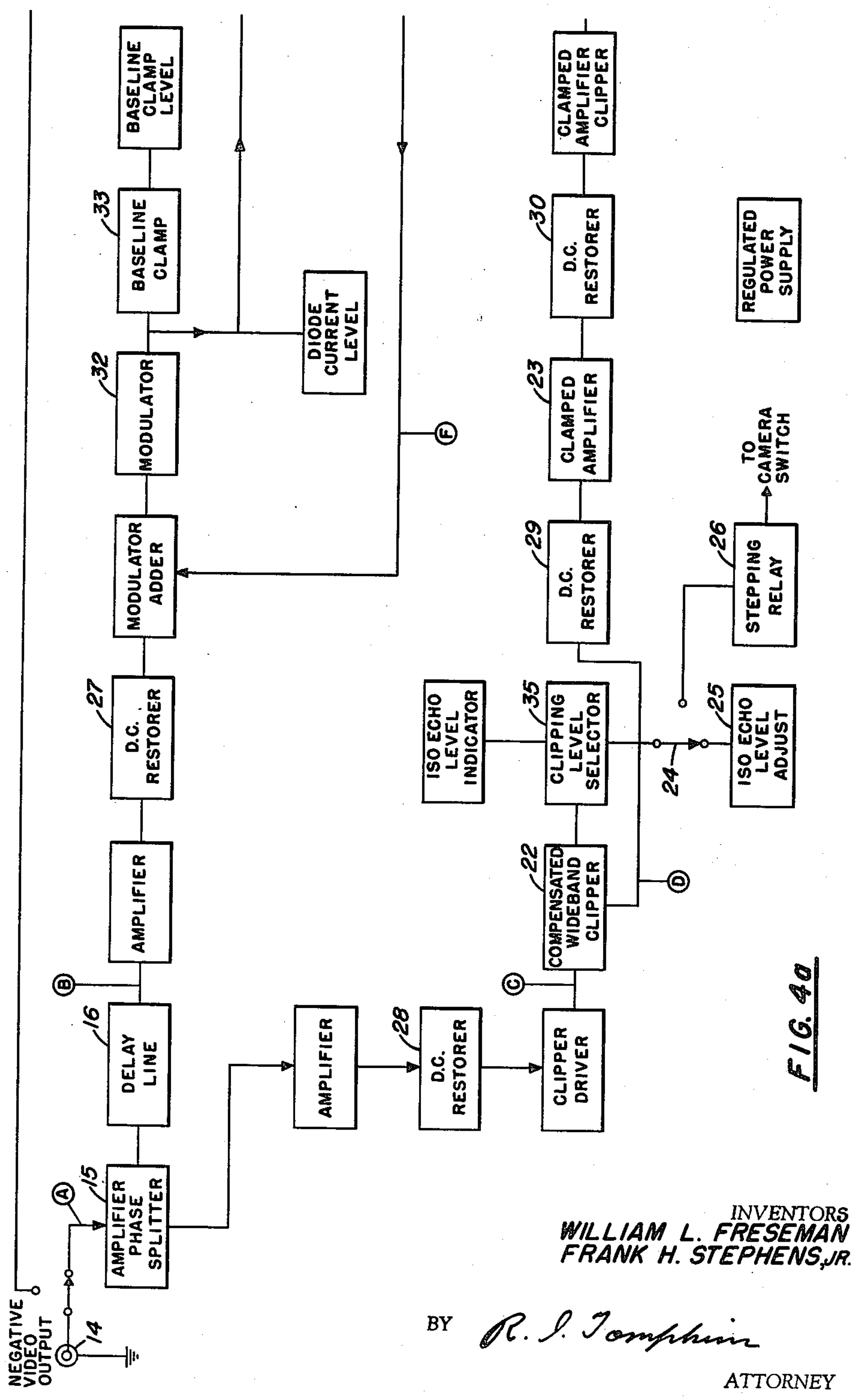

FIG. 4*a* shows a portion of a detailed block diagram of the iso-echo contour device.

Figure 4B:
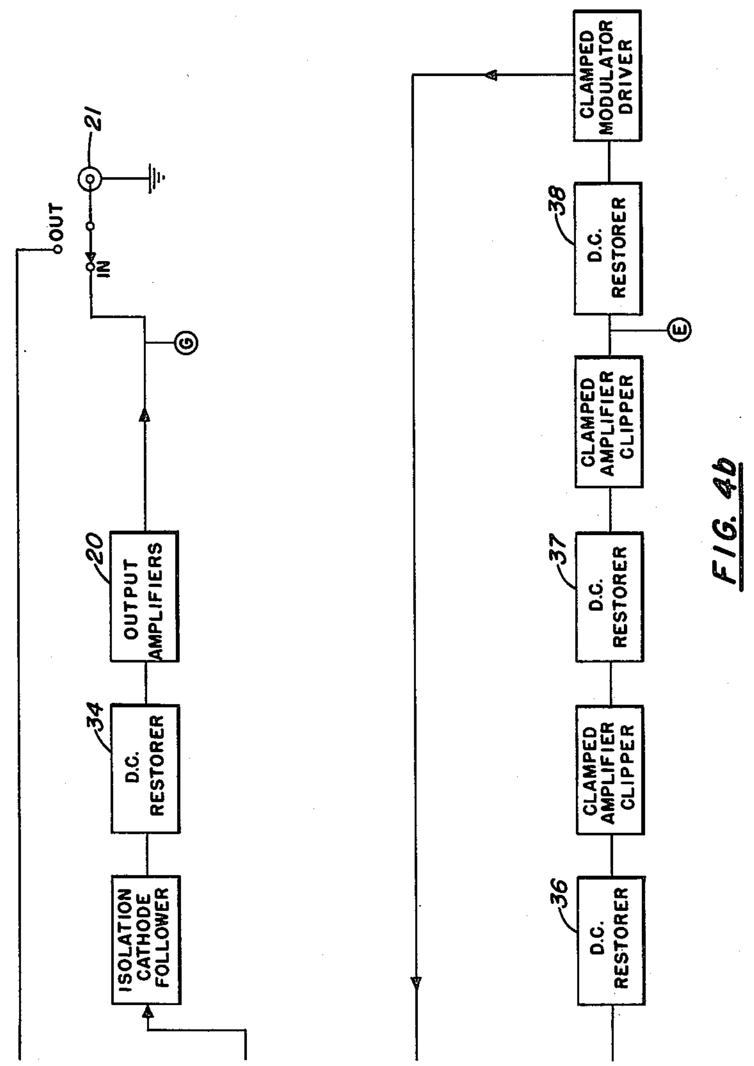

FIG. 4*b* shows another portion of the detailed block diagram, to be used in conjunction with FIG. 4*a*.

Figure 5A:
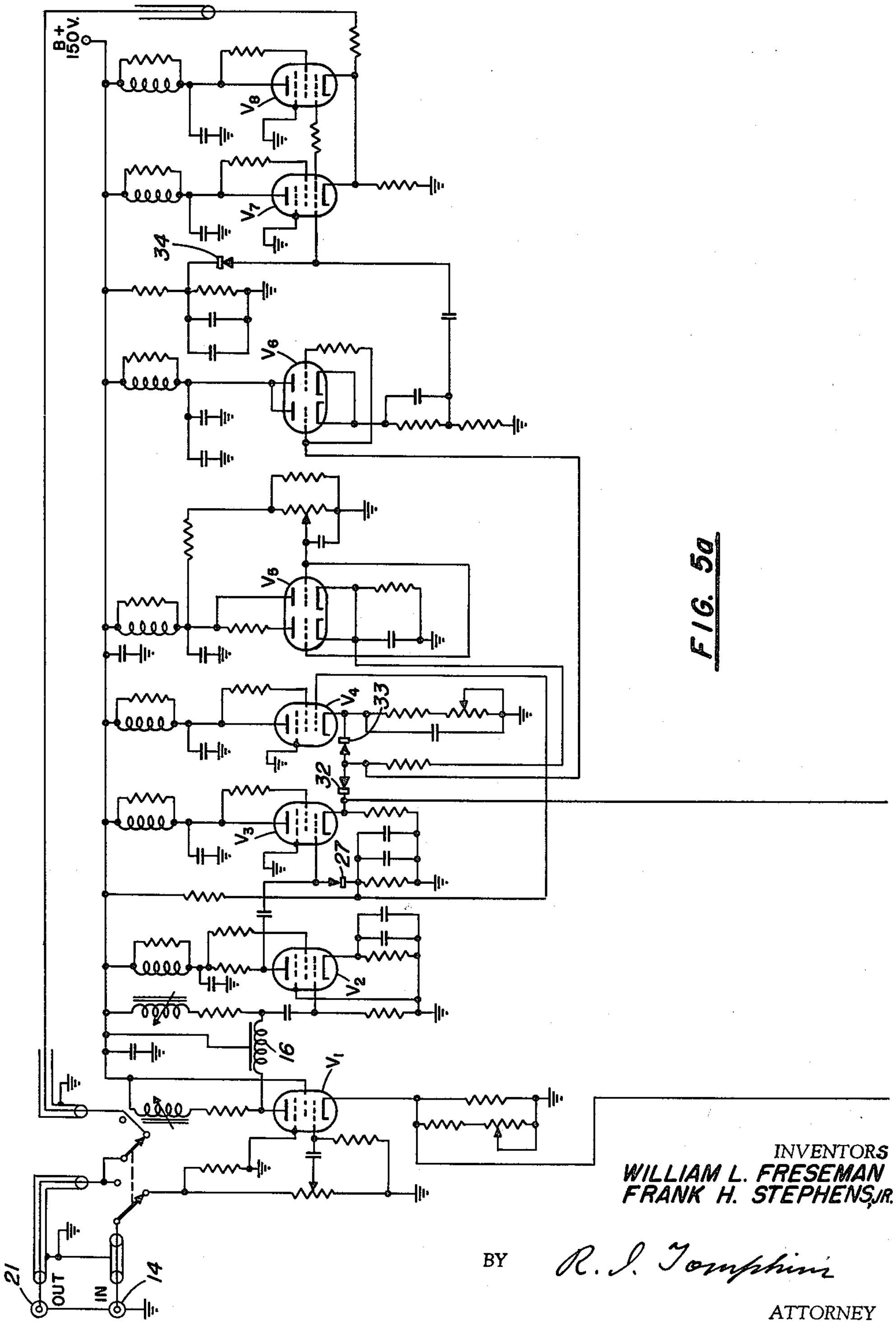

FIG. 5*a* shows a circuit diagram for a portion of the invention.

Figure 5B:
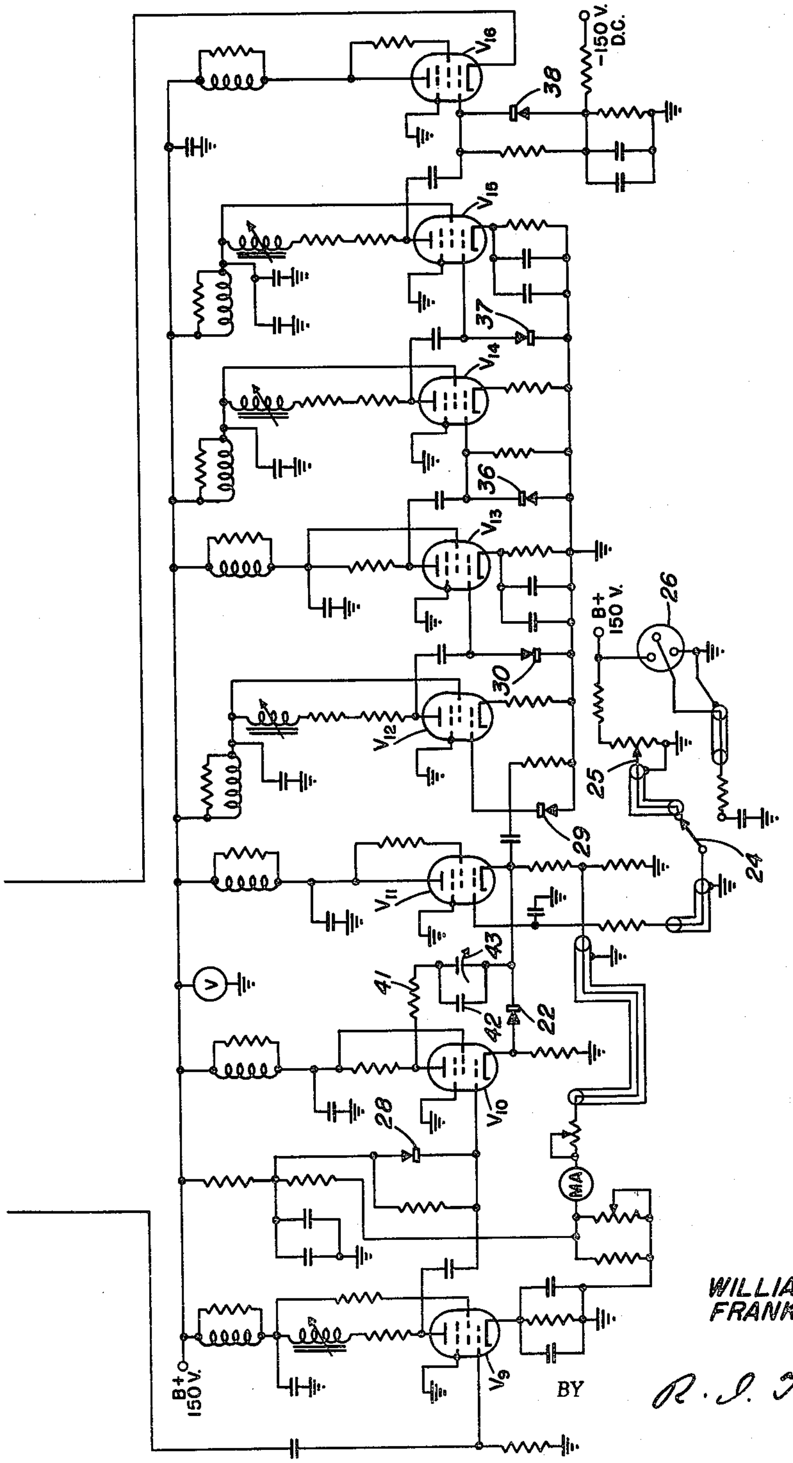

FIG. 5*b* shows a circuit diagram for another portion of the invention, to be used in conjunction with FIG. 5*a*.

Figure 1E:
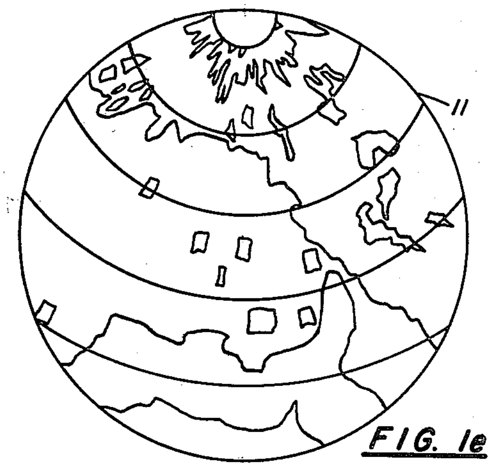
Figure 1D:
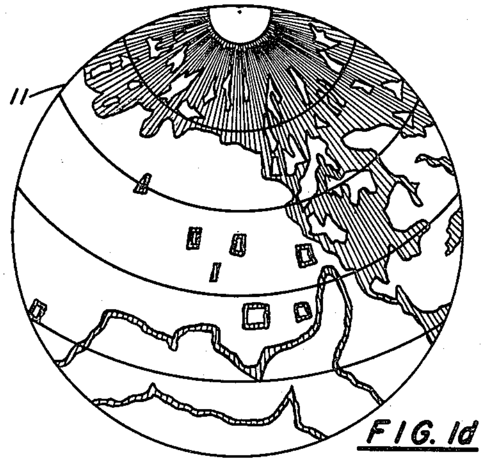
Figure 1C:
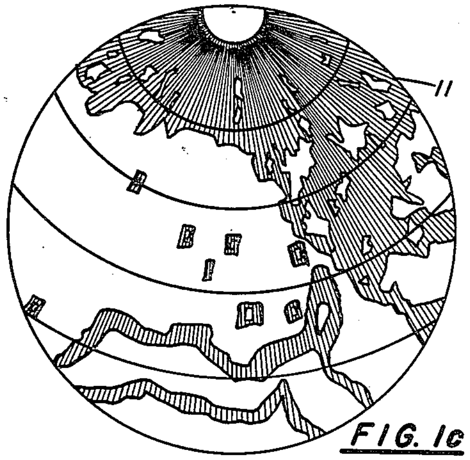
Figure 1B:
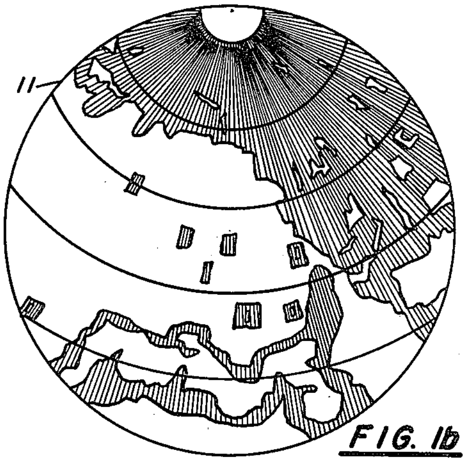
Figure 1A:
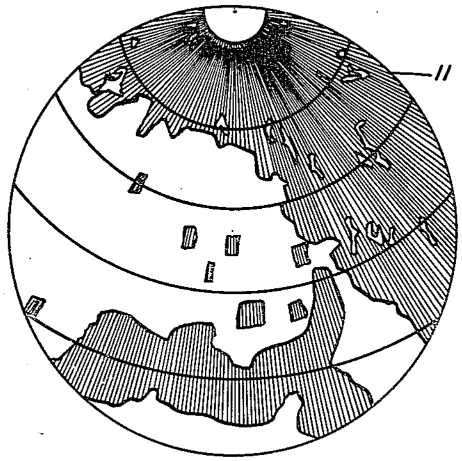

Referring now to the drawings, wherein like reference characters designate like or corresponding parts throughout the several views, there is shown in FIG. 1*a* a cathode ray tube 11, presenting a P.P.I. display, wherein there is shown a number of land and marine targets with no iso-echo inversion, the targets being shown exactly as received. FIGS. 1*b*, 1*c*, 1*d*, and 1*e* show increasing amounts of signal inversion, and although some of the marine targets (ships and small boats) seem to disappear this can be explained by their rolling and movement which causes their target echo strength to fluctuate widely.

In FIG. 1*b*, the light holes appearing in the echoes represent intense signal returns greater than the iso-echo inversion level preset for this reading. These holes, for example, represent buildings or other structures which would give a stronger echo return than the surrounding terrain. It will be appreciated that this adds much detail lacking originally in FIG. 1*a*.

In FIG. 1*c*, iso-echo is obtained at still more inversion than in FIG. 1*b*, and at this level even more of the marine targets are partially affected. Evidence of a strong reflection is seen in the group of targets at the bottom of the figure. This hole could represent a building, structure, or other point of interest.

Referring now to FIGS. 1*d* and 1*e* the effects of even more inversion can be observed, and in the last view, FIG. 1*e*, only target outlines are left, resulting in an outline map of the reflecting surfaces. Needless to say, any number of inversion levels may be selected by adjustment of the device, and the data derived yields much information concerning target strength not available from ordinary radar equipment, the data being useful in the study of meteorological phenomena as an indication of the extent of rainfall, for example.

Figure 2:
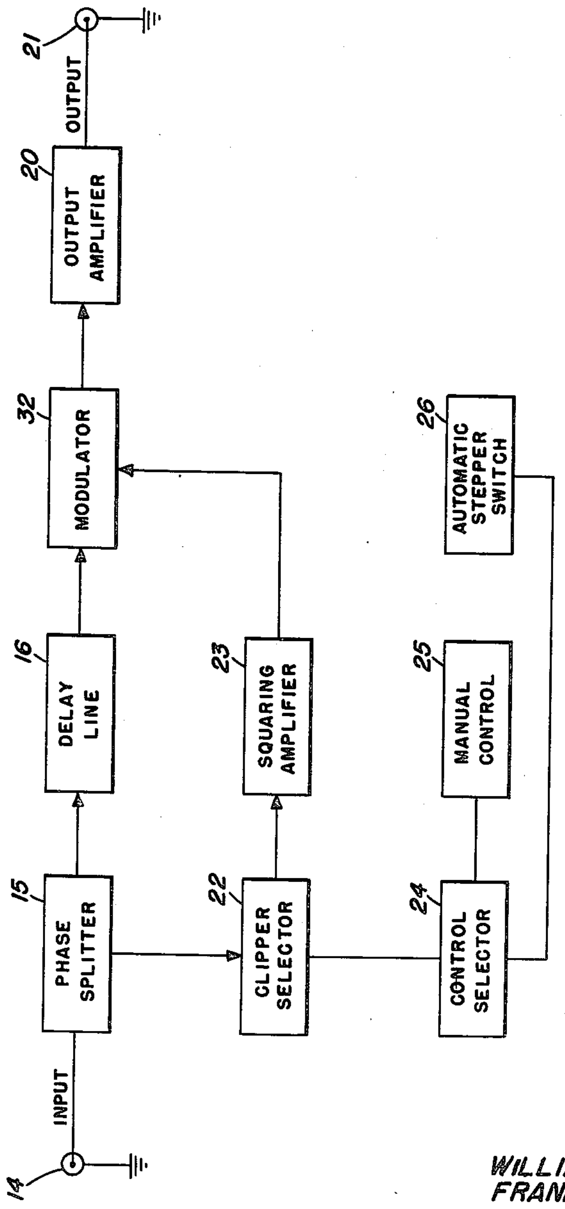
FIG. 2 shows a simplified block diagram of the iso-echo contour device.

In FIG. 2 there is shown a simplified block diagram of the iso-echo contour device. Following the diagram now in the same progression as traced by a signal there is an input terminal 14 connected in sequence by a phase splitter 15, or any other well known means of changing polarity of a signal, a delay line 16, a modulator 32, an output amplifier 20 and output terminal 21. Forming a parallel path with the above signal path there is a clipper selector 22 connected to the output of phase splitter 15, this in turn being followed by a squaring amplifier 23 the output of which is connected to modulator 32. Also connected to the input of clipper selector 22 is a control selector 24, this in turn being connected to both a manual control 25 and an automatic stepper switch 26.

Figure 3:
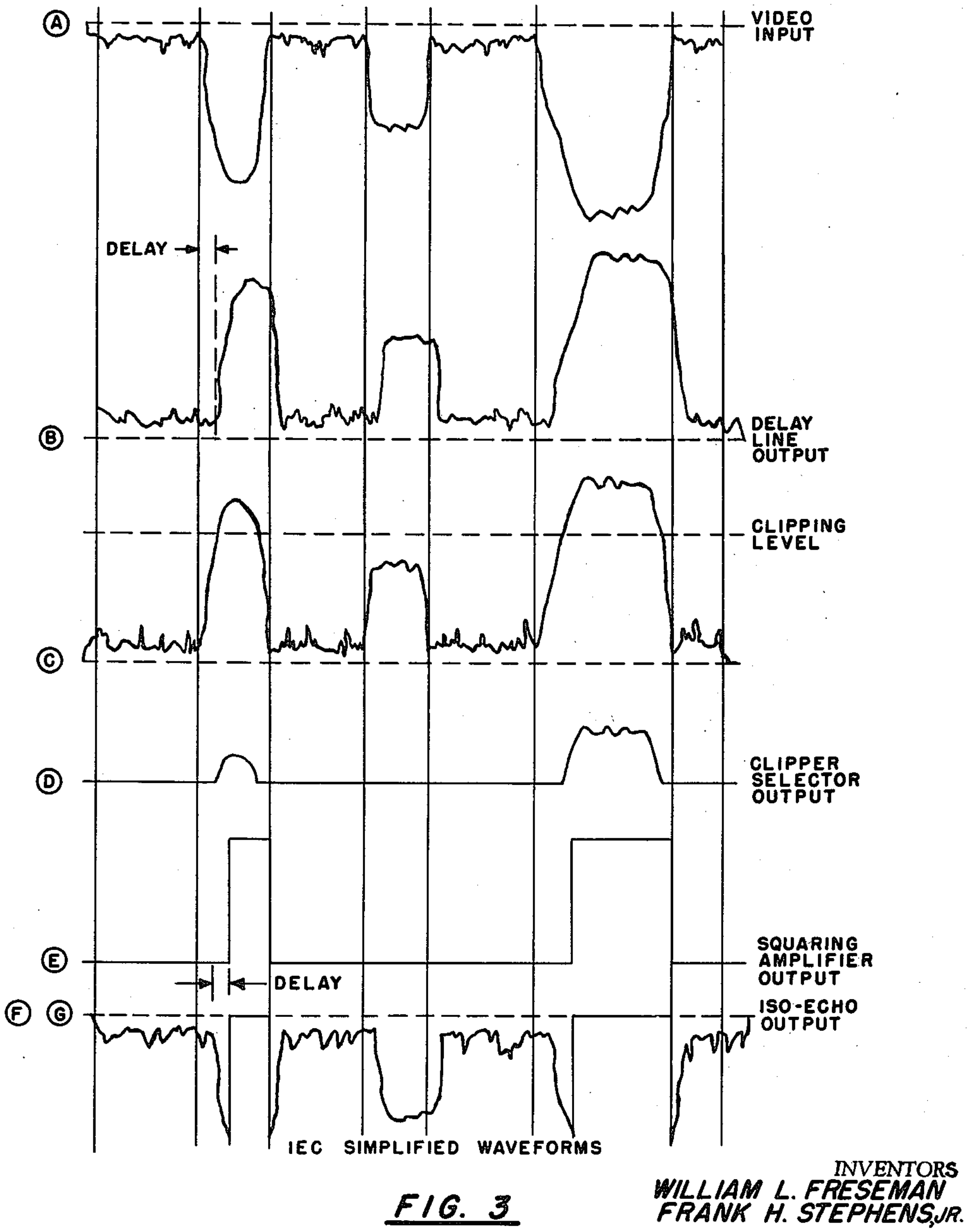
FIG. 3 shows a series of simplified waveforms operated by the various stages of the present invention.

The waveforms of FIG. 3 are essentially self-explanatory, and are derived from the check points A through G, shown in FIGS. *4a* and *4b*. It will be observed that the signal at point A is a negative-going video signal of varying intensity, while at point B the signal has been inverted and a slight delay inserted through the operation of phase splitter 15 and delay line 16. Before the signal enters clipper selector 22 it has been inverted to a positive signal as shown at point C, and the clipping level established as will be fully explained hereinafter. The output of clipper selector 22 produces the waveform shown at point D, it then being squared by squaring amplifier 23, as shown at point E. The final iso-echo output is illustrated by the waveform at points F and G, the squared, inverted signal having been combined in modulator 32 with the delayed unmodified signal passing through the parallel signal channel. As clearly seen the inversion completely removes signals above any desired strength, depending on the selected clipping level.

Turning now to FIGS. *4a* and *4b* there is shown a more detailed block diagram of the invention, the two figures being placed together for a complete picture. For the sake of brevity well known components such as amplifiers, power supply and isolation cathode followers will not be discussed. It is to be noted, however, that D.C. restorers 27, 28, 29, 30, 34, 36, 37, and 38, as well as modulator 32, baseline clamp 33, and compensated wideband clipper 22, are all germanium diodes of any familiar form, the operation of which will be described later.

A complete circuit diagram of the invention is shown by combining FIG. *5a* and FIG. *5b*. Inasmuch as like components in the block diagrams of FIG. 2, FIG. *4a* and FIG. *4b* have been given the same numerals in the circuit diagram, and the interconnection between these components have been previously discussed, further breakdown of FIGS. *5a* and *5b* will be dispensed with at this point.

Basically, the circuit functions and mode of operation of the iso-echo contour device are as follows:

Referring to the simplified block diagram of FIG. 2 it will be seen that there are two major signal paths within the unit. FIG. 3 shows the video waveforms at various points as labeled. The input at 14 (or A) consists of negative-going video waveforms, and, as is obvious, represents three echoes such as might be seen on an "R" scope presentation. From the plate and cathode of tube $V_1$, forming a component of the phase splitter 15, the signal is fed to both the delay line 16 and the clipper selector 22.

The delay line 16 is used to correct the time-phase of the signals so that when the two signal paths converge at the modulator 32 the time delay through each path is identical. The clipper-selector 22 consists of a peak selector diode, and passes only those portions of the video waveform that exceed a selectable, well defined clipping level. This level and the output waveform from the clipper-selector 22 is shown in waveform sketches C and D, FIG. 3. The output of the clipper-selector is amplified and squared into rectangular gating pulses by the squaring amplifier 23 and tubes $V_{13}$, $V_{14}$ and $V_{15}$ (FIG. *5b*). Sketch E, FIG. 3, represents the waveform at the output of the squaring amplifier and it consists of constant amplitude rectangular pulses whose widths are equivalent to the length of time the video signal spends above clipping level, as shown in sketch C, FIG. 3.

These rectangular pulses are fed into the modulator 32 where they blank the video signal from which they are derived. This blanking action is carried out in such a way that the video signals are blanked down to their zero-signal baseline without overshoot, and the net result is shown in sketch F, G, FIG. 3.

The heart of this system is the compensated wideband clipper-selector 22, which, because of its characteristics, is capable of functioning on very fast waveforms and provides "base clipping" without feed-through when cut off. The elimination of feed-through when the clipper is cut off is accomplished by a unique resistance-capacitance network (which will be described in detail later) in the anode circuit of $V_{10}$ whereby an out-of-phase signal is fed around clipper 22 to compensate for capacitive leakage through 22 when it is in a non-conducting state, thereby enhancing the action of the clipper diode 22 at high frequencies. The IN54A type, germanium diode, non-linear element used as a clipper possesses an extremely sharp break in its conduction characteristic and the circuit in which it is used is designed, as mentioned above, to eliminate the effects of capacitive susceptance inherent in such devices.

The use of a squaring amplifier, such as 23, greatly enhances the break in the conduction characteristic of the germanium diode 22. For example, at a video level of 2.0 volts, peak to peak, the break has been measured as a signal increment of 0.05 volts. In other words, a 0.05 volt increment at a 2.0 volt video level is sufficient to generate a blanking pulse (such as shown at E, FIG. 3) when the clipping level (C, FIG. 3) is set at exactly 2.0 volts.

Referring to the block diagram of FIGS. *4a*, *4b*, or the schematic diagram of FIGS. *5a*, *5b*, it will be seen that there are 16 vacuum tubes and 11 germanium diodes. When in operation, a 2.0 volt, peak to peak, video signal (negative going) is fed into pentode $V_1$ which functions as a phase splitter and delay line driver. The positive video signal is then fed from the plate of pentode $V_1$ to the delay line 16, which is used to compensate for the path length difference between the two main signal paths of the circuit. This is done so that the video signal and corresponding gating signals will be in the proper time phase when they enter the modulator 32. Pentode $V_2$ is a video amplifier which inverts the positive video signal appearing at the end of delay line 16. Germanium diode 27 is used for D.C. restoration at the grid of a modulator-adder $V_3$, and the diode establishes the zero signal axis at the cathode of $V_3$, referring it to a D.C. voltage approximately 0.1 volt lower than the D.C. level at the other side of the modulator crystal 32. All negative going video signals will therefore cause 32 to conduct, while positive voltages will cut off diode 32 and prevent any signals from appearing at the grid of $V_6$.

Diode 33, the baseline clamp diode is so connected and biased that it conducts only when the video signal should attempt to go postive and hence prevents positive peaks from appearing at the output of 32. Pentode $V_4$ sets the bias level on diode 33 and is adjusted so that the diode just starts to draw current under zero signal conditions. Dual triode $V_5$ adjusts the bias on diode 32 so that 32 just starts to draw current (through its load resistor) under zero signal conditions.

The overall result of the above circuit configuration is to allow only negative going video signals to appear at the grid of triode $V_6$ regardless of the signals appearing at the cathode of modulator adder $V_3$. The resultant signals are passed through isolation cathode follower $V_6$, and the output amplifiers $V_7$, $V_8$ to the output terminal 21.

Going now along the other major signal path, the negative video signal appearing at the cathode of pentode $V_1$ is amplified in turn by amplifier $V_9$ and applied to the grid of clipper driver $V_{10}$, where it is referred to a D.C. level at the cathode of $V_{10}$ by germanium diode 28 functioning as a D.C. restorer. The compensated wideband clipper-selector, germanium diode D22, has connected between its output terminal and the anode of tube $V_{10}$ a resistance-capacitance network comprising resistance 41 in series with a parallel connected fixed capacitance 42 and adjustable capacitance 43. This resistance-capacitance network in the anode circuit of $V_{10}$, in operation, feeds an out-of-phase signal around clipper-selector D22 to compensate for capacitive leakage through D22 when it is in a non-conducting state, thereby enhancing the action of the clipper diode 22 at high frequencies.

The compensated wide band clipper-selector D22 is biased by clipping level selector pentode $V_{11}$ so that it will pass only signals above a certain amplitude, while rejecting completely those portions below the chosen level. The bias applied to $V_{11}$, and therefore the extent of signal inversion obtained through the clipping function performed by diode D22 is controlled by the position of switch 24 which connects either manually operated potentiometer 25, or automatic stepping switch 26 into the grid circuit of tube $V_{11}$. It should be noted that for the sake of simplicity only one potentiometer 25 is illustrated, while in fact any number may be employed, depending on the number of successive interim steps desired between the extremes of full and no signal inversion.

These selected signal peaks, as passed by tube $V_{11}$, are amplified and squared by tubes $V_{12}$, $V_{13}$, $V_{14}$, and $V_{15}$ so that they become constant amplitude blocks of rectangular pulses whose time duration corresponds to the desired blanking interval. These positive going rectangular pulses are applied at the cathode of modulator adder $V_3$ where they cause the input of the modulator to go positive and thence through cut off, thereby gating off the video signals appearing at the input of tube $V_3$.

Because of the fast acting circuits provided by wideband techniques it is possible to operate on short radar pulses and complex waveforms, such as are found to comprise radar echoes. Good circuit function has been obtained on pulses as short as 0.4 microsecond. However, due to the finite rise-time characteristics of P.P.I. repeaters and associated equipments with which the unit is used, the best operation has been obtained where the pulse length-rise time ratio is the greatest.

The power supply portion of the unit is integral with it, but is not shown for the sake of simplicity. It consists of an electronically regulated plate and bias supply providing both plus and minus 150 volts D.C.

The stepper switch circuitry, shown as 26, FIG. 5*b*, which provides automatic adjustment of the iso-echo level settings when cycled manually, or triggered by antenna azimuth or automatic camera, is shown broadly in FIG. 4*a*. It consists of a number of voltage divider potentiometers, each one of which may be individually adjusted to supply the desired reference voltage to the clipping level selector $V_{11}$, in order to set the video level at which iso-echo contours appear.

From the above description of the invention, and its mode of operation, it is clear that there is provided a novel iso-echo contour device which can be employed in the study of meteorological data, through the expedient of effecting a video inversion of signals above a predetermined level. The video inversion may be obtained either manually or automatically, in steps as desired, through the operation of a novel clipper-selector circuit.

Obviously many modifications and variations of the present invention are possible in the light of the above teachings. It is therefore to be understood that within the scope of the appended claims the invention may be practiced otherwise than as specifically described.

What is claimed is:

1. An iso-echo contour circuit comprising an input for receiving video signals, means for altering the polarity of said signal connected to said input, first and second signal paths connected to the polarity altering means, a delay means in the first path, a modulator-adder having a cathode following the delay means, a modulator connected to the cathode of the modulator-adder, a clipper selector in said second path, a squaring amplifier following the clipper selector, and means for connecting the output of the squaring amplifier to the junction of the modulator-adder and the modulator, whereby signal inversion occurs in the first signal path.

2. The circuit of claim 1 including a control means connected to the clipper selector for determining the clipping level of the clipper-selector.

3. An iso-echo contour circuit comprising an input terminal for receiving video signals, means for altering the polarity of said signal connected to the input terminal, a delay line following the polarity altering means for delaying the signal a predetermined amount, a modulator-adder having a cathode following the delay line, a modulator connected to the cathode of the modulator-adder, a base line clamp connected to the modulator, a clipper-selector also connected to said polarity altering means, said clipper clipping the tops of the video signal at an adjustable level, a squaring amplifier for squaring the output of the clipper selector, and means connecting the squaring amplifier and the modulator, whereby the squared output of the clipper selector is superimposed on the video signal to cause inversion of a desired portion of the video signal.

4. An iso-echo contour circuit comprising an input terminal for receiving video signals, means for altering the polarity of said signal connected to said input terminal, a delay line following the polarity altering means for delaying the video signal a predetermined amount, a modulator-adder having a cathode following the delay line, diode means in the grid circuit of said modulator-adder for determining the operating level of the modulator-adder, a modulator connected to the cathode of the modulator-adder, a base line clamp connected to the modulator, an output terminal, a clipper-selector also connected to said polarity altering means, said clipper selector clipping the tops of the video signal at an adjustable level, control means connected to the clipper-selector for varying the level at which the video signal is clipped, a squaring amplifier for squaring the output of the clipper-selector, means connecting the squaring amplifier and the modulator, and means connecting the modulator and the output terminal whereby the squared output of the clipper-selector is superimposed on the video signal to blank out a desired portion of the video signal.

5. An iso-echo contour circuit comprising an input terminal for receiving video signals, a multiple grid signal polarity reverser connected to said input terminal, a delay line connected to the output of said signal reverser, a modulator-adder having a cathode following the delay line, diode means in the grid circuit of the modulator-adder for determining the operating level of the modulator-adder, a modulator connected to the cathode of the modulator-adder, a base line clamp connected back-to-back with the modulator so that they are poled in opposite directions, means connected to the base line clamp for determining its operating level, a diode clipper also connected to the signal reverser, said clipper acting to clip the peaks of the video signal at an adjustable level, means connected to said clipper for adjusting the clipping level, a multiple grid amplifier for squaring the output of the clipper, and means connecting the squaring amplifier with the junction of the modulator-adder cathode and the modulator, whereby the squared output of the clipper is superimposed on the video signal in the modulator resulting in an inversion of the strongest video signal to a degree dependent upon the setting of the clipping level.

(References on following page)

References Cited in the file of this patent

UNITED STATES PATENTS

| | | |
|---|---|---|
| 2,426,189 | Espenschied | Aug. 26, 1947 |
| 2,489,297 | Labin et al. | Nov. 29, 1949 |
| 2,490,025 | Bryan | Dec. 6, 1949 |
| 2,605,463 | Hirschberg et al. | July 29, 1952 |
| 2,656,531 | Atlas | Oct. 20, 1953 |
| 2,786,993 | Reid | Mar. 26, 1957 |
| 2,822,538 | Trevor | Feb. 4, 1958 |
| 2,861,185 | Hopper | Nov. 18, 1958 |
| 2,906,871 | Crawford | Sept. 29, 1959 |
| 2,908,812 | Laurent | Oct. 13, 1959 |
| 2,977,585 | Cunningham | Mar. 28, 1961 |
| 3,024,457 | Dale | Mar. 6, 1962 |